Patented June 21, 1927.

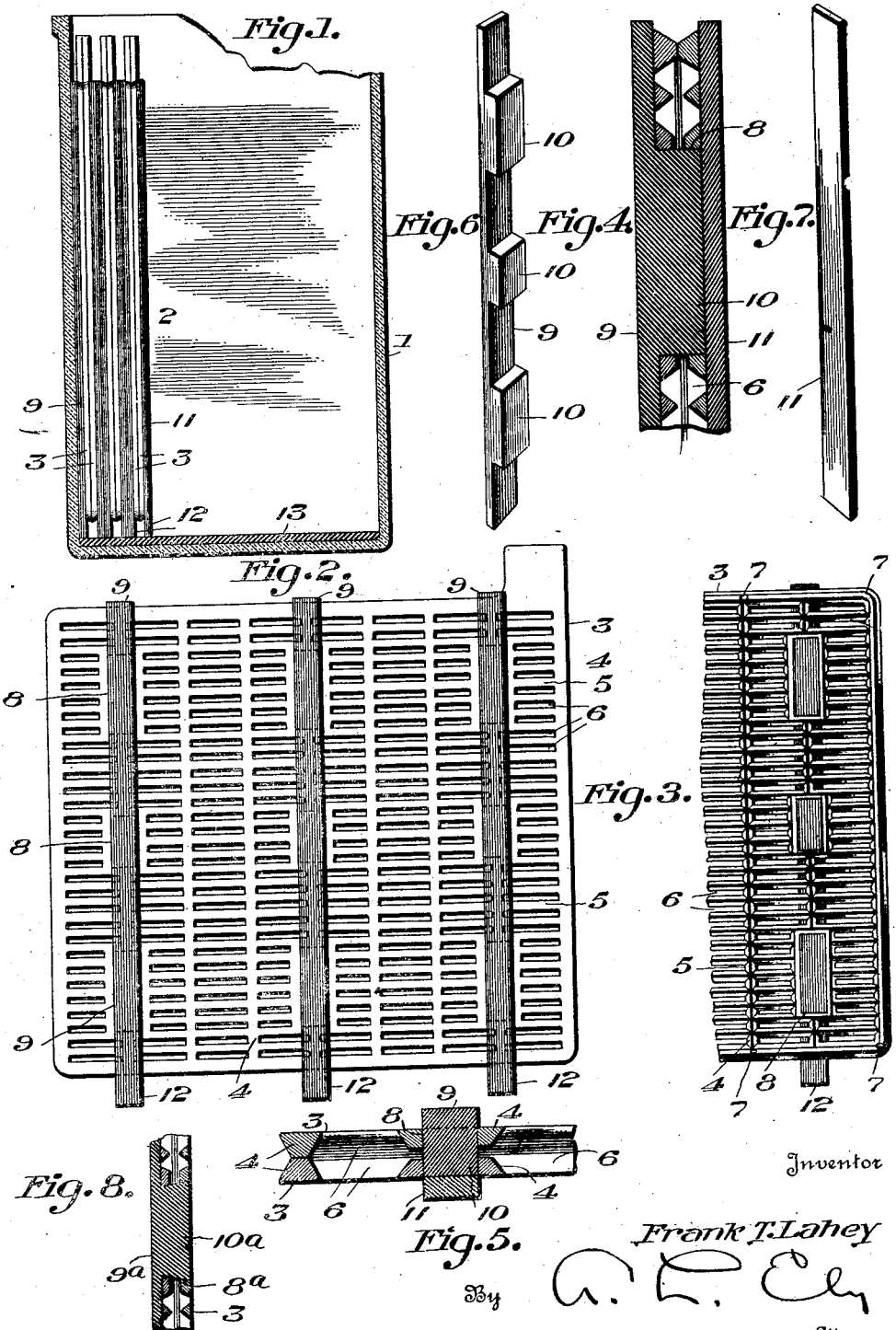

1,633,257

UNITED STATES PATENT OFFICE.

FRANK T. LAHEY, OF AKRON, OHIO.

STORAGE BATTERY.

Application filed May 5, 1922. Serial No. 558,641.

This invention relates to storage batteries, the object of the invention being to improve upon and simplify previous constructions and to provide a superior device for spacing the plates of the battery and, if desired, for supporting them in the battery jar.

These and other objects will be apparent from the detailed description and drawings, it being understood that such details as are shown and described are not to be taken as limiting the invention to the exact form and proportions shown, but that the invention is entitled to a range of equivalents within the scope of the claims appended hereto.

In the drawings, in which one embodiment of the invention is shown:

Figure 1 is a vertical section through a battery jar, showing several elements of the battery in position;

Figure 2 is a face view of one of the elements or electrodes;

Figure 3 is a view showing the reverse or inner face of one of the plates which constitutes, with a companion plate, a single element of the battery;

Figure 4 is a vertical section on the line 4—4 of Figure 2;

Figure 5 is a horizontal section on the line 5—5 of Figure 2;

Figures 6 and 7 are perspective views of the two rubber separating strips before they are placed in position on the battery element;

Figure 8 is a modified form of the invention.

The battery forming the subject matter of this application, comprises the usual jar or container 1 made of insulating material.

The battery element is indicated, in general, by the numeral 2 and comprises, in the preferred construction, a pair of plates 3. The plates may be of any desired or well known form, that shown comprising a plurality of vertical ribs 4 and intersecting parallel horizontal ribs 5 forming a grid with a large number of elongated rectanglar openings 6. The ribs are preferably triangular in cross-section and when the two plates are placed together, the apices of the ribs face each other. The two plates are preferably held together at a number of points by welds or "lead burns" 7.

While I have shown this particular form of plate and the same represents a practical and economical construction, it will be understood that other forms of plates may be used, nor is the invention limited to a double-plate electrode, but may be used with a single plate forming the electrode.

At suitable points on the electrode are provided a plurality of apertures or openings 8 which extend through both of the plates. As shown, the apertures are arranged along the outside and center vertical ribs 4, although any other arrangement may be provided. In the form illustrated there are three openings, in a single vertical row, the central opening being smaller than the upper and lower openings.

In order to separate the electrodes of the battery, there are provided a number of vertical parallel insulating strips on either side of each electrode, the strips being joined together by arms or projections extending through the apertures 8. These strips are formed of any suitable insulating material, which should also be fusible, such as, hard rubber, one strip in each pair being shown at 9 with a plurality of lugs or projections 10, of the same shape and location as the apertures 8. When this strip is placed over the plate with the lugs projecting through the apertures, the second parallel strip 11 is placed over the lugs and connected therewith. This may be done by buffing and cementing the projecting surfaces of the lugs and the contacting surfaces of the strips 11. These surfaces are then pressed into contact and the entire plate may be placed in a vulcanizer and the strips will be vulcanized so as to be hard and capable of withstanding the usage to which the battery element is subjected.

The strips 9 and 11 should extend to the top of the battery plate so that no projecting ledge is allowed for the accumulation of deposits with resultant short circuiting. Also, if desired, the strips may be extended below the lower edge of the battery plate to form legs or supports 12 to hold the battery plates in an elevated position above the bottom of the cell, thus dispensing with the usual ribs on the bottom of the battery jar. A resilient pad 13 of soft rubber or other material may be placed in the bottom of the jar on which the lower ends of the strips are sealed to support the electrodes and cushion them against the jars and vibrations incident to use.

In the modification shown in Figure 8 the strips 9ª are connected to the plates 3 by lugs 10ª which are preferably flared or formed with a dovetail, the apertures or recesses 8ª being correspondingly formed. After vulcanization of the strips in position they will be permanently held and removal of the strips will be prevented.

In either case the strips are permanently attached to the plates by vulcanization, the objects of the invention being secured by the use of a fusible insulating material which is permanently secured in position by fusion. This result is accomplished by the use of either form of the invention or by any suitable modification thereof.

Changes and modifications may be made in constructing batteries embodying the principles of this invention, and such changes as fall within the scope of the invention are intended to be covered herein.

What I claim is:

1. In a storage battery, an electrode, and means for supporting said electrode within a jar comprising a plurality of insulating strips said strips being vulcanized in place on the electrode and extending below the lower edge of the electrode.

2. In a storage battery, an electrode, and means for supporting and spacing said electrode within a jar comprising a strip on the side of said electrode, lugs on said strip passing through the electrode, the strip extending below the lower edge of the electrode and being permanently secured by vulcanization of the strip and the lugs.

3. In a battery construction, a battery jar, an electrode, a plurality of unconnected vertical separating strips having lugs thereon extending through the electrode said strips being composed of a rubber composition and being permanently secured in place by vulcanization, and a resilient cushion in the bottom of the jar to receive the strips and support the electrode.

4. In a battery construction, an electrode comprising two plates the plates being provided with aligned apertures arranged in vertical rows, unconnected vertical separating strips of rubber composition over the rows, and plugs of the same material passing through the apertures said strips being permanently secured in place by vulcanization.

5. In a battery construction, a battery plate, unconnected and spaced separating strips of rubber composition at one side of the plate, the plate being formed with recesses located beneath the strips, and lugs of similar composition in the apertures, the lugs and strips being so arranged that after vulcanization the strips are permanently secured on the plates.

6. In a storage battery construction, a pair of plates forming a single element of a battery, vertical strips of fusible insulating material on opposite sides of said element, the strips being aligned in pairs, and lugs extending through the element and connecting the pairs of strips together, the said strips being extended below the plates to act as a support therefor.

7. A storage battery comprising, a battery jar, a pair of plates having coinciding apertures therein and forming an element of the battery, vertical strips of fusible insulating material on opposite sides of said elements in aligned pairs overlying said apertures, and lugs of insulating material extending through said apertures and connecting the strips of the pairs together, the said strips and lugs being molded as an integral whole into place on said element and being formed with portions extending below the element adapted to act as a support therefor.

FRANK T. LAHEY.